(12) United States Patent
Roth et al.

(10) Patent No.: US 8,317,098 B2
(45) Date of Patent: Nov. 27, 2012

(54) ITEM HAVING A DATA TAG

(75) Inventors: Joseph D. Roth, Springboro, OH (US); John B. Holz, Natick, MA (US)

(73) Assignee: NCR Corporation, Duluth, GA (US)

(*) Notice: Subject to any disclaimer, the term of this patent is extended or adjusted under 35 U.S.C. 154(b) by 1223 days.

(21) Appl. No.: 11/607,704

(22) Filed: Dec. 1, 2006

(65) Prior Publication Data

US 2008/0128492 A1 Jun. 5, 2008

(51) Int. Cl.
*G06Q 30/00* (2012.01)

(52) U.S. Cl. ........ 235/385; 235/435; 235/440; 235/454; 235/462.45

(58) Field of Classification Search .................. 235/385, 235/440, 454, 462.45, 435
See application file for complete search history.

(56) References Cited

U.S. PATENT DOCUMENTS

| | | | | |
|---|---|---|---|---|
| 5,532,104 A | * | 7/1996 | Goto | .............................. 430/139 |
| 6,203,069 B1 | * | 3/2001 | Outwater et al. | ................ 283/88 |
| 6,612,494 B1 | * | 9/2003 | Outwater | ................. 235/462.04 |
| 6,830,181 B1 | * | 12/2004 | Bennett | .......................... 235/440 |
| 7,309,011 B2 | * | 12/2007 | He | ................................. 235/385 |
| 7,322,520 B2 | * | 1/2008 | Warden et al. | ................. 235/383 |
| 2002/0145037 A1 | | 10/2002 | Goodwin, III | |
| 2004/0074964 A1 | | 4/2004 | Falkenrich-Wesche | |
| 2004/0099736 A1 | * | 5/2004 | Neumark | ...................... 235/385 |
| 2006/0006231 A1 | | 1/2006 | Anson et al. | |
| 2006/0213989 A1 | | 9/2006 | Ahmadi et al. | |
| 2006/0226219 A1 | * | 10/2006 | Warden et al. | ................. 235/383 |
| 2007/0001006 A1 | * | 1/2007 | Schuessler et al. | ........... 235/451 |
| 2007/0256136 A1 | * | 11/2007 | Simske et al. | ................... 726/26 |
| 2008/0000960 A1 | * | 1/2008 | Outwater et al. | ............. 235/375 |

* cited by examiner

*Primary Examiner* — Kristy A Haupt
(74) *Attorney, Agent, or Firm* — Robert S. Chee; Peter H. Priest

(57) ABSTRACT

A method of enabling subsequent validation of an item having a data tag. Data may be read from a tag using an electronic reader. A readable marker, such as a barcode, may be selected from a plurality of different readable markers and applied in proximity to the tag. An association request can be created and communicated to a database, where the association request comprises data from the tag and data relating to the selected readable marker, so that the database may use data from the association request for subsequent validation of the tag. An authentication database for recording an association between a data tag and a readable marker applied to an item carrying that data tag are also described.

20 Claims, 7 Drawing Sheets

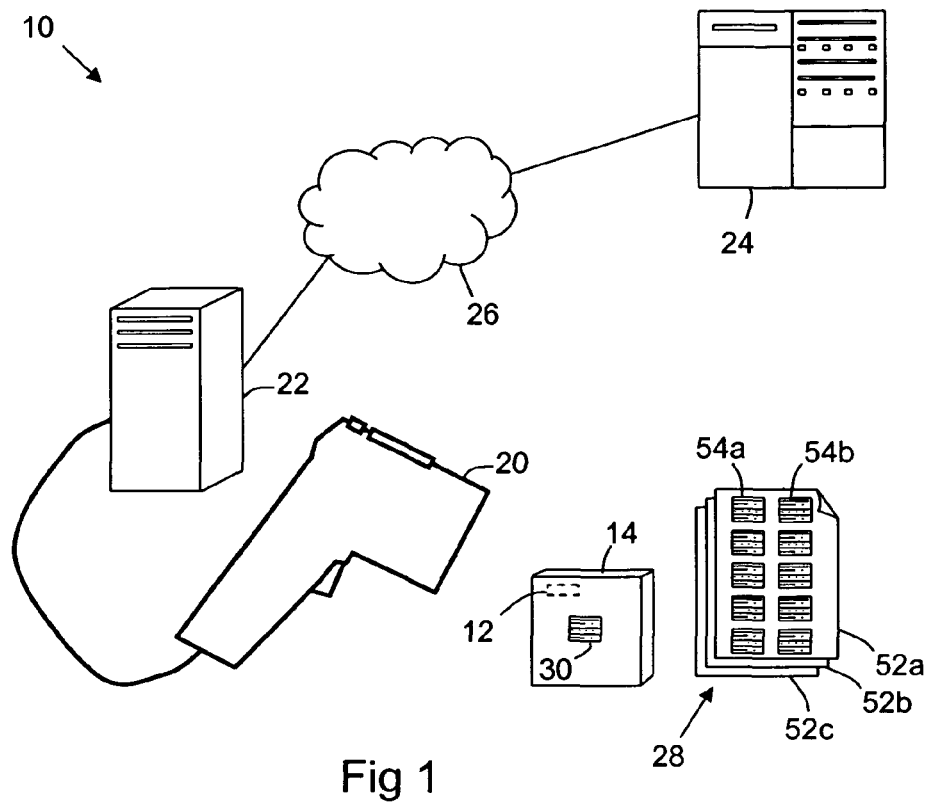
Fig 1
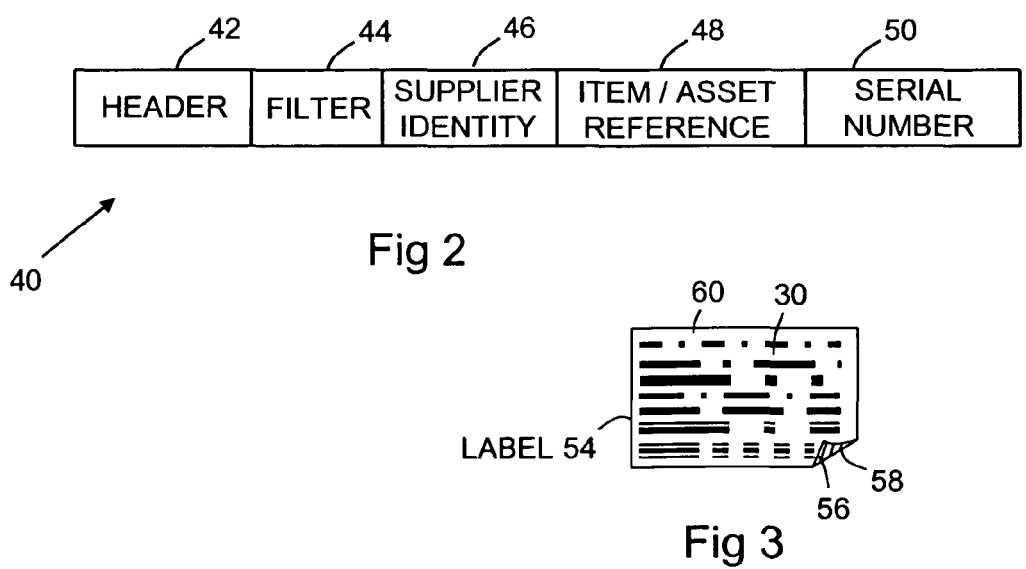
Fig 2
Fig 3

Fig 6
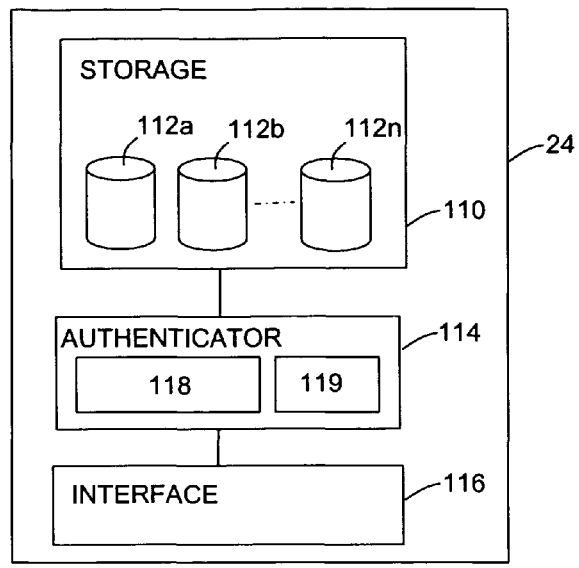
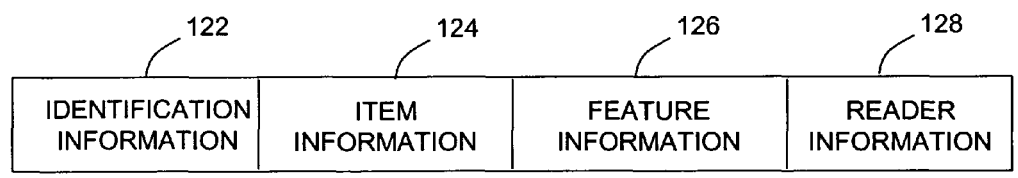
Fig 7A
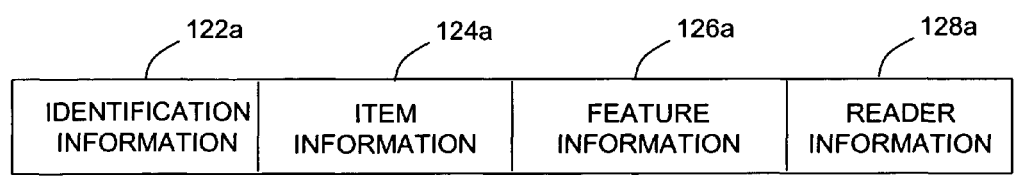
Fig 7B
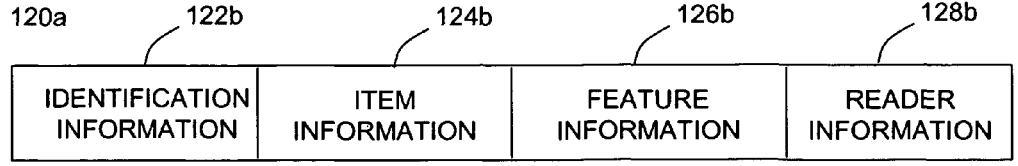
Fig 7C

ITEM HAVING A DATA TAG

The present invention relates to an item having a data tag.

BACKGROUND

Data tags store or represent data, and are commonly used in automated identification and data capture (AIDC) applications. By reading a data tag, a user or system can access information about an item to which the tag is attached. There are different types of data tags, including: bar codes, magnetic stripes, integrated circuit cards, and radio-frequency identification (RFID) transponders. RFID transponder data tags are referred to herein as RFID tags.

RFID tags use radio waves and store data that can be read wirelessly at relatively short distances. RFID tags are a popular choice for AIDC applications due to their small size and ease of reading without requiring line-of-sight.

One disadvantage associated with using RFID tags is that there is potential for the data stored in the tag to be changed, for example, through fraud, or through data corruption.

It would be advantageous to have a mechanism for validating the integrity of data stored on an RFID tag; that is, to validate that the data currently stored on a tag is the same as the data originally stored on the tag. It would also be advantageous to have a mechanism for ensuring that the RFID tag has not been removed from an item it was originally attached to, and attached to a different item.

SUMMARY

According to a first aspect of the present invention there is provided a method of enabling subsequent validation of an item having a data tag, the method comprising: reading data from a tag using an electronic reader; selecting a readable marker from a plurality of different readable markers; applying the selected readable marker to the item in proximity to the tag; and communicating an association request to a database, where the association request comprises data from the tag and data relating to the selected readable marker, so that the database may use data from the association request for subsequent validation of the tag.

As used herein, an electronic reader includes any reader that reads data using electrical signals (such as radio waves) and/or optical signals (such as photons) and/or magnetic signals (such as a magnetic field). The term "electronic reader" is not intended to, and does not, cover a human being reading data using his/her eyes.

The step of selecting a readable marker from a plurality of different readable markers may be performed before, during, or after the step of reading data from a tag.

The readable marker may be human readable and/or machine readable. The readable marker may comprise one or more of the following non-exclusive list: a character string, a geometric shape, a spatial code (such as a barcode), a pattern, a color, or any other convenient readable marker. Using a barcode has the advantage that there are currently readers available that can read barcodes, and 2D barcodes can represent a substantial amount of data.

The readable marker may be a character string comprising numbers and/or letters. Alternatively, the readable marker may be a security feature that is difficult to counterfeit. Such a security feature may be human readable, such as a hologram, or machine readable, such as a luminophore. As used herein, a "luminophore" is a luminescing substance. A luminophore may be in the form of a pigment applied to an ink, or a fluid having luminescent properties.

As used herein, the word "proximity" includes contact with the tag and nearness to the tag. Therefore, the selected readable marker may be in registration with the tag, partially overlapping the tag, or close to but not touching one or more edges of the tag.

The step of selecting a readable marker from a plurality of different readable markers may be implemented by selecting from a prepared batch of different readable markers of the same type (such as geometric shapes).

The method may include the further step of providing readable markers as labels on a holder, such as a roll or sheet. For example, there may be a roll or sheet of labels, each label having a readable marker. Not every readable marker needs to be different to all other readable markers of that type; for example, every nth label may be identical, so that there may only be n different readable markers of that type. For example, the type of readable marker may be a luminophore, and there may be ten different readable markers, each with a unique luminescence signature. Thus, a sheet of labels may have multiple identical readable markers on the sheet.

Where labels are used, the labels may be transparent to allow the labels to be affixed on top of, and in registration with, the tag. Where the readable marker is invisible to the human eye (a covert feature), and the tag is visible to the human eye, this allows an operator of an electronic reader to locate the readable marker by locating the tag.

Applying the selected readable marker in proximity to the tag may be implemented by removing the selected readable marker from the holder and adhering the label to the tag or to an item to which the tag is affixed. Transparent, pressure-sensitive adhesive may be provided on one side of the label to enable the label to be adhered to the tag.

A label may be releasably mounted on a backing sheet or may be applied by heat treatment, chemical treatment, or the like.

The method may include the further step of reading the selected readable marker, either before, during, or after applying the selected readable marker in proximity to the tag.

Reading the selected readable marker may be implemented by a marker reader. The marker reader may be coupled to the database by a network to allow the reader to issue the association request. The marker reader may read both the tag and the readable marker; that is, the marker reader may be a combined tag and marker reader. Such a combined reader performs the functions of an electronic reader and a marker reader.

The tag may be an RFID transponder. Alternatively, the tag may be a barcode, magnetic stripe, or integrated circuit card.

The item may be a consumer product, equipment, machinery, real or portable property, a plant, an animal, a pallet, or the like.

According to a second aspect of the present invention there is provided a method of recording an association between an item having a data tag and a readable marker applied to that item, the method comprising: receiving an association request comprising data from the data tag and information about a readable marker applied to the item; verifying the validity of the association request; and creating an entry for the tagged item in the event that the association request is validated, the entry comprising data from the tag, and information about the readable marker applied to the tagged item.

The step of creating an entry for the tagged item may include indexing the entry using information read from the tag or from the readable marker. This would allow the data from the tag or the marker to be used to access an entry uniquely.

Verifying the validity of the association request may include validating that the association request relates to an item (or type of item) previously registered but not previously associated.

Verifying the validity of the association request may include validating that the association request was transmitted by an authorized marker reader.

The created entry may include or reference information about marker readers authorized to request authentication of the tagged item.

The data from a tag may uniquely identify the item, for example it may include a unique serial number. The data from a tag may include details about the type of item that has been tagged.

The method may include the further steps of receiving an authentication request comprising data read from a tag on an item and information about a readable marker applied to the tagged item, comparing the authentication request with the created entry to ascertain if the tagged item is authentic, and validating the authentication request in the event of a match.

The created entry may further comprise information about the tagged item.

The created entry may include all of the data read from the tag, so that when the tag is subsequently authenticated the database can validate that the contents of the tag at authentication time match the contents of the tag recorded in the database. This provides a mechanism for validating the contents of the tag, that is, that the data stored by the tag has not been changed since the tag was associated with the readable marker. It also provided a mechanism to recreate the data stored on the tag using the database entry. Alternatively or additionally, the created entry may contain a hash of the data read from the tag. This provides a mechanism for validating that the contents of the tag have not changed.

The plurality of different readable markers may be different readable markers of the same type (or class), such as geometric shapes, numbers, or the like.

According to a third aspect of the invention there is provided an authentication database for recording an association between a data tag and a readable marker applied to an item carrying that data tag, the database comprising: an interface which receives an association request comprising data from a tag applied to an item and information about a readable marker applied to the item; and an authenticator which is operable to (i) validate the association request, and (ii) create an entry for the tag in the event that the association request is validated, the entry comprising data from the tag, information about the tagged item, and information about the readable marker applied to the tagged item.

The database may include a security component. The security component may include a timestamp generator, a transaction identifier counter, and a unique system identification.

The database may include a log file for storing details of failed and/or successful authentication requests.

The authenticator may also be operable to (iii) receive an authentication request comprising data from a tag and information about a readable marker applied to an item carrying that tag, (iv) identify any created entry including identical tag data to the data from a tag in the authentication request, (v) compare the readable marker information in the identified created entry with the readable marker information in the authentication request, and (vi) confirm the authenticity of the tag in the event of a match.

The readable marker may be related to the information stored in the data tag. For example, the readable marker may be a hash of the stored tag information, or it may be a check digit. This enables the readable marker to be used to validate that the contents of the data tag have not changed. The readable marker may be related to the information stored in the data tag using an algorithm. For example the algorithm may calculate the number of 1's or the number of 0's in the binary code stored in the data tag. For a 96 bit RFID tag, the value would range from 0 to 96. Thus ninety-seven unique readable markers would be required. The remote database would know the relationship between the readable marker and the RFID tag. If the information in the RFID tag was altered it would not correspond to the readable marker. Thus, the database would not authenticate the RFID tag.

More complex algorithms can be used to map the relationship between the information in a data tag and the readable marker. A more secure algorithm would use a unique readable marker for the 96 bit sequence. The readable marker may be randomly assigned to the information in the data tag, or it may be assigned in a logical sequence. For a 96 bit RFID tag, $2^{96}$ readable codes would be required to cover the entire range of possible bit sequences; however, in most practical applications only a subset of this possible number would be needed.

A batch of preprinted readable markers may be provided, and a data tag may be programmed with data to match the particular preprinted label applied to the item to which the tag is attached. This has the disadvantage that some of the bits in the data tag are not available for item information as they are needed to match the readable marker.

Where the data tag is an RFID tag, and the readable marker is human readable, an RFID reader may read the RFID tag to read the information stored on the tag. The RFID reader may then query the database to ascertain what readable marker is associated with that RFID tag. This information is then relayed back to the human operator, who decides if the readable marker described by the database matches the readable marker associated with the RFID tag. If the readable marker is correct for that RFID tag then the authenticity of the RFID tag is confirmed by the database.

The information may be relayed back to the human operator via a display or the scanner could be used that projects the information onto the readable marker to allow the readable marker to be matched with the relayed information.

Instead of relaying only the correct information, the database may relay the correct information together with one or more other choices so that the human operator must select the one that matches the readable marker. This eliminates the problem of the human confirming a match without actually checking for a match.

Where an optical readable marker is used, the readable marker may include fluorescent inks or photochromic inks.

The lowest security embodiment may use visibly printed readable markers. Higher security readable markers may use luminescent, photochromic, or thermochromic dyes and/or pigments.

Photochromic dyes/pigments can be used to provide an invisible barcode that becomes temporarily visible when exposed to UV light. The data tag can be read, then the readable marker can be exposed to UV light and the resulting photochromic barcode can then read by a barcode scanner module. The UV light and the barcode scanning module may be provided in a marker reader.

According to a fourth aspect of the present invention there is provided a method of enabling subsequent validation of an item, the method comprising: reading data from a readable marker provided on an item; writing data to a tag carried by that item; and communicating an association request to a database, where the association request comprises data written to the tag and data read from the readable marker, so that the database may use data from the association request for subsequent validation of the tag.

According to a fifth aspect of the present invention there is provided a reader for reading an item carrying a radio-frequency data tag, a barcode, and an optical security feature, the reader comprising: an RFID reading engine for reading data stored in the data tag; a barcode reading engine for reading the barcode, and a spectral read engine for reading the optical security feature.

The spectral read engine may comprise an illumination source to excite the optical security feature, and a spectrometer to measure luminescence in response to excitation by the illumination source.

The reader may be coupled to a database to allow the reader to send authentication requests thereto and to receive authentication responses therefrom.

The reader may include a security module including a unique identification, and being operable to transmit the unique identification each time an authentication request is sent to the database, to allow the reader to be identified by the database.

The security module may include an encryption unit. Additionally, the security module may be tamper responsive for destroying any stored encryption data (such as keys, algorithms, or such like) in the event that the security module is tampered with. Tamper responsive features typically detect any attempt to disassemble or penetrate a security module, for example, by detecting penetration of a conducting mesh surrounding the unit, by detecting removal of screws or other fixtures holding the unit together, or by detecting cutting of any data-carrying wires. Tamper responsive features are typically connected to an erase pin on a non-volatile memory storing encryption data.

The security module may include a clock generator, and may also include a timestamp generator.

The secure reader may include a global positioning system (GPS) receiver to allow the reader to provide the database with details of the reader's current position. In operation, the GPS receiver continually determines its position. Periodically, the database may send a packet request to the reader which asks for the reader's unique hardware identification (which may be a MAC address of a communications adapter), the current latitude/longitude, and a GPS timestamp and a timestamp from the timestamp generator.

The GPS timestamp may be used to calibrate the timestamp from the timestamp generator. If the times (which are incremented as ticks from a known base) do not match, then the secure reader may have been compromised.

The latitude and longitude (that is, the position of the secure reader) are determined from a GPS Course Acquisition (CA) signal. As the CA accuracy increases with newer GPS receivers, the positional accuracy will also increase.

An altitude value may also be provided to indicate where in a building (that is, which floor of a multi-story building) the secure reader is located.

These periodic readings may be stored in the data store of the database. If there is a change in the readings without a corresponding re-registration request from the secure reader incorporating the GPS receiver, then the database may execute a trigger to notify the owner of the database. Such readings may be taken daily, although the frequency of such readings may depend on the service level requested and paid for by the customer.

The secure reader may include an auxiliary cryptographic device that enables the reader to be authenticated prior to allowing any software to be downloaded or updated. The auxiliary cryptographic device may be a dongle, a smart card, or the like.

The auxiliary cryptographic device may store a unique code that is transmitted to the database by the secure reader as part of the registration request. The secure reader may transmit a de-registration request to the database if the auxiliary cryptographic device is removed, or if the unique code is not provided by the auxiliary cryptographic device. If the auxiliary cryptographic device is replaced, then the secure reader may have to re-register with the database. The database may compare current information transmitted by the secure reader as part of the re-registration request with information transmitted prior to de-registering the auxiliary cryptographic device. This information may include location information in addition to information relating to the identity of the secure reader, for example, a MAC address and hardware serial numbers. If the current information is consistent with the information transmitted prior to de-registering the auxiliary cryptographic device then the database may re-register the secure reader.

These aspects of the present invention have the advantage that the association between the information in the data tag and the readable marker is only known by a database. The database will validate a data tag if and only if the readable marker is correct for the information stored in the data tag. The readable marker may also include a character string that indicates what data is stored in the data tag.

The database can ascertain when there are problems with data tags because there may be a high number of failed authentications relating to a data tag.

Knowing when and where counterfeiters are attempting to breach security is valuable information.

Where the readable marker is uniquely associated with the data, the combination of the readable marker and data tag can ensure the integrity of the information in the data tag. If the information is altered for malicious intent or if the data tag accidentally gets "zapped", the readable marker detects this. The database could even be used to retrieve the information that was originally stored in the now corrupted data tag.

Reverse engineering a readable marker is not particularly useful for a counterfeiter. This will only allow the counterfeiter to make counterfeit items having exactly that data tag information. For serialized components (each having a unique serial number) this would make it very easy to detect a counterfeit, as the database would receive multiple requests to authenticate the same tag data. If a counterfeiter wants to make an item having different data tag information, the counterfeiter has no way of knowing what the readable marker should be.

Embodiments of the present invention will now be described, by way of example, with reference to the accompanying drawings.

BRIEF DESCRIPTION OF THE DRAWINGS

In the accompanying drawings:

FIG. 1 is a schematic diagram of a data tag system according to one embodiment of the present invention;

FIG. 2 a block diagram illustrating a data structure of a data tag of the system of FIG. 1;

FIG. 3 is a pictorial diagram showing a part (a readable marker label) of the system of FIG. 1 in more detail;

FIG. 6 is a block diagram illustrating a part (a remote database) of the system of FIG. 1 in more detail;

FIG. 7A is a bock diagram illustrating a data structure of a typical entry in the remote database of FIG. 6;

FIG. 7B is a bock diagram illustrating a data structure of a master entry in the remote database of FIG. 6;

FIG. 7C is a bock diagram illustrating a data structure of an item record entry in the remote database of FIG. 6;

DETAILED DESCRIPTION

Figure 4:
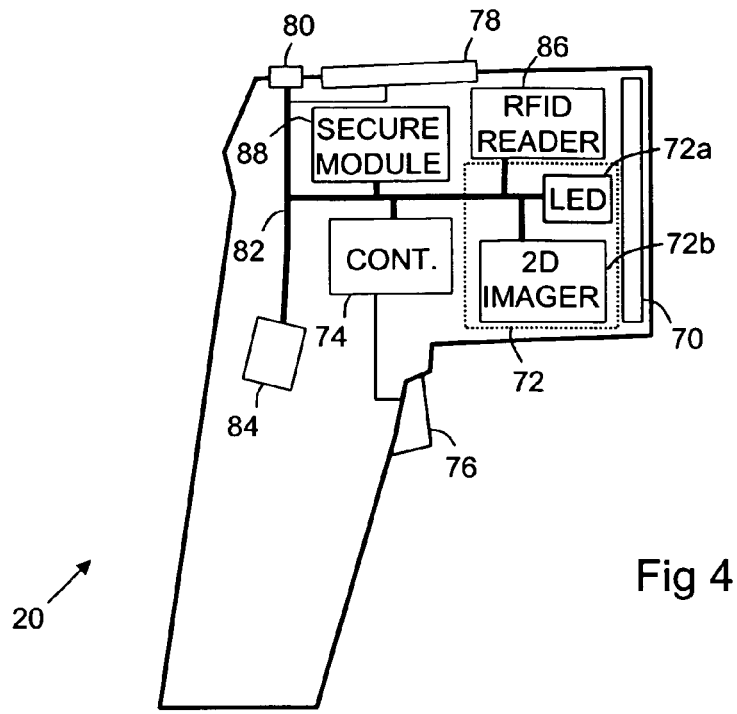
FIG. 4 is a schematic diagram illustrating a part (a marker reader) of the system of FIG. 1 in more detail.

Reference is first made to FIG. 1, which is a schematic diagram of a data tag association and authentication system 10 according to one embodiment of the present invention. The system 10 is used for validating a data tag 12 attached to an item 14. In this embodiment, the data tags 12 are RFID tags, and the items 14 are packs of razor cartridges.

The system 10 comprises: a secure reader 20, a computer 22 coupled to the secure reader 20, and a remote database 24 coupled to the computer 20 by a network 26. A batch 28 of readable markers 30 is also provided for use with the system 10, as will be described in more detail below.

The Data Tag

In this embodiment, the data tag 12 is a 96 bit RFID transponder having a data structure 40 shown generally in FIG. 2. The data structure 40 comprises: a header field 42 that stores a code indicating the structure of the tag 12; a filter field 44 that indicates whether the RFID tag 12 is attached to a pallet, a case, or an item (in this embodiment it is an item); a supplier field 46 that stores a unique code associated with the company that manufactured the item; an item or asset reference field 48 that stores information relating to the item to which the tag is attached; and a serial number field 50 storing a unique serial number for that item 14.

The Readable Marker

Reference will now also be made to FIG. 3, which is a pictorial diagram showing the readable marker batch 28 in more detail.

The readable marker batch 28 comprises a plurality of sheets 52a, b, c, . . . m. Each sheet 52 comprising a plurality of readable marker labels 54a, b, . . . n releasably mounted on the sheet 52. For illustration purposes, only three sheets 52 and ten labels 54 are shown in FIG. 1, but a readable marker batch 28 may comprise many more sheets 52 and labels 54 than are illustrated in FIG. 1.

As best seen in FIG. 3, each readable marker label 54 has a lower surface 56 covered with a layer of transparent, pressure-sensitive adhesive (illustrated by hatching 58), and an upper surface 60 on which is printed the readable marker 30 in the form of a 2D photochromic barcode. This type of readable marker is a covert security feature because the 2D barcode is normally invisible but after exposure to ultra-violet (UV) light, the 2D barcode 30 becomes visible temporarily.

A 2D photochromic barcode can be printed using a conventional inkjet printer filled with photochromic ink, or a laser printer having a photochromic laser cartridge.

The 2D barcode 30 stores a relatively large amount of information, over 2,500 characters, which is sufficient to store the entire contents of the 96 bit RFID tag 12, in addition to other data.

When the system 10 is being used, an operator can remove one of the 2D barcode labels 54 and adhere it to an outer surface of the razor cartridge pack 14.

The Razor Cartridge Pack

When the razor cartridge pack 14 is being manufactured, an RFID tag 12 is mounted on an inner surface of the pack 14. Once an operator has applied a 2D barcode label 54 to an outer surface of the razor cartridge pack 14, the pack 14 contains both an RFID tag 12 and a 2D barcode readable marker 30.

The Secure Reader

Figure 5:
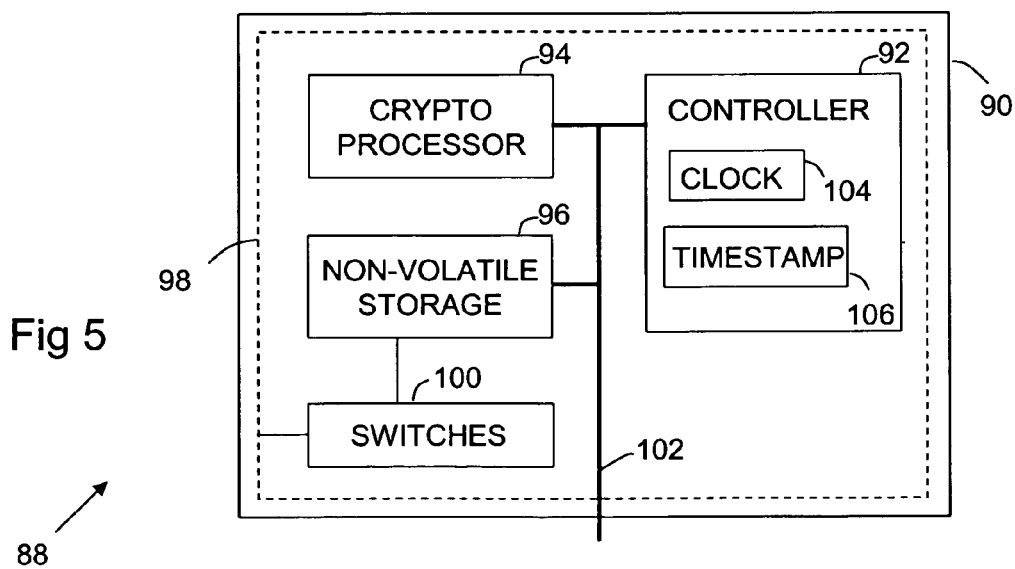
FIG. 5 is a block diagram illustrating a part (a security module) of the marker reader of FIG. 4 in more detail.

Reference will also now be made to FIGS. 4 and 5, which are diagrams showing the secure reader 20 in more detail.

The secure reader 20 comprises a combined barcode reader and RFID tag reader. The secure reader 20 is a modified conventional 2D barcode scanner, such as a barcode scanner available from Symbol Technologies, Inc.® or Metrologic Instruments, Inc.®.

The secure reader 20 comprises: a scanning window 70; a marker reader module 72 aligned with the scanning window 70; associated control electronics 74 for activating the conventional imager 72 (in response to a user depressing a trigger 76) and processing data received from the imager 72; an LCD panel 78 for outputting information to the user (such as information from the 2D barcode 30, the status of the secure reader 20, and such like); a function button 80 for controlling the function of the secure reader 20; internal connections 82 for interconnecting the various components within the secure reader 20; a communications module 84 (including a unique hardware identification in the form of a MAC address) implementing communications with the computer 22; an RF read engine 86 for reading the RFID tag 12 carried by the razor pack 14; and a security module 88 coupled to the RF read engine 86.

The marker reader module 72 comprises an LED source 72a for exposing the photochromic 2D barcode 30 to UV light, and a conventional 2D barcode imager 72b for imaging the 2D barcode when stimulated by the UV light.

The security module 88 (best seen in FIG. 5) comprises a sealed housing 90 in which the following components are mounted: control electronics 92 for driving the marker reader module 72 and for processing data received therefrom; a conventional cryptographic processor 94 to support encrypted communication with the computer 22; non-volatile storage 96 for storing encryption keys and/or encryption algorithms; a security membrane 98 (illustrated by a broken line in FIG. 5) disposed around an inside surface of the housing 90 and coupled to tamper switches 100 that activate an erase line of the non-volatile storage 96 when the membrane 100 is penetrated or disturbed, thereby destroying any stored encryption data (such as keys, algorithms, or such like) in the event that the security module 88 is tampered with. An internal bus arrangement 102 is also provided to facilitate communications within the housing 90.

The control electronics 92 includes a clock 104, and a timestamp generator 106 that maintains a timer using an offset from a known base, incremented by ticks based on the clock 104.

The Remote Database

Reference will now also be made to FIG. 6, which is a block diagram illustrating the remote database 24 in more detail, and to FIG. 7A, which is a block diagram illustrating a data structure of a typical entry in the remote database 24. The remote database 24 comprises: a data store 110 including a plurality of storage areas 112a, b, . . . each storage area 112 having the capacity to store a large number of data entries; an authenticator 114 for accessing the data store 110 to authenticate requests received from the secure reader 20; and a secure reader interface 116 for receiving authentication requests from, and transmitting response to, the secure reader 20.

The authenticator 114 also includes: a security component 118 including a timestamp generator, a transaction identifier counter, and a unique system identification; and a log file 119 for storing details of successful and failed authentications.

A typical data entry (an item record) stored in storage area 112 has the format shown in FIG. 7A. The item record 120 comprises four main categories of information: company identification information 122, item information 124, readable marker information 126, and secure reader information 128.

The company identification information 122 includes a company identification field, which may be derived from the UCC Company Prefix in the 2D barcode 30 or may be different in the event that the RFID supplier codes do not match those assigned to the UCC Company Prefix. The company identification field uniquely identifies the manufacturer of the razor cartridge packs 14. The company identification information 122 may include additional fields not listed herein.

The item information 124 includes fields for a description of the item 14, a serial number and/or part number of the item 14, and a location where the item is manufactured and/or distributed. Other information from the 2D barcode 30 may also be included in the item information 124.

The description of the item may include the item name (for example, a brand name), the item type (a razor pack), item specifications (the number of blades on each razor cartridge), and such like. Additional or different fields may be provided depending on the particular item, the application and/or industry that item will be used in, and the value of that item.

The feature information 126 includes fields indicating the type of readable marker (optical, magnetic, radio-frequency, or such like) if more than one type of readable marker is in use, and data representing the readable marker. The data representing the readable marker may be raw data, or some transformation of the raw data. In this embodiment, the readable markers used are photochromic barcodes, and the data representing the readable marker comprises the raw data represented by the photochromic barcodes, and a unique hash of the raw data (in this embodiment using an MD5 hash function algorithm). The hash of the raw data allows quick and efficient comparison of two barcodes.

The secure reader information 128 includes fields indicating the identity and/or location of those readers 20 that are permitted to request authentication of the item 14 listed in the item information 124.

Initial Customer Registration

A customer is registered with the system 10 and item records are created prior to using the system 10 for authentication. This involves the owner or operator of the database 24 performing the following actions: (i) creating entries in the remote database 24 for the customer (new customer entries) using the unique code associated with the company (from the supplier field 46 of the RFID tag 12) and (ii) providing the customer with a batch 28 of readable markers 30 in the form of photochromic 2D barcodes, where the UCC Company Prefix of the 2D barcodes 30 identifies the same company as identified by the supplier field 46 of the RFID tags 12 used by that company. The actual codes for the UCC Company Prefix and the supplier field may be different because the UCC Company Prefix may not comply with the same code assignment as that of the particular RFID standard being used.

The readable marker batch 28 has n different 2D barcodes 30, where n is a relatively low number (between five and fifteen) if medium level security is required, and n is a relatively high number (over fifteen) if high level security is required. Typically, the higher the value of n the more the customer has to pay for the batch 28. In this example, n is ten. The batch contains tens of thousands of 2D barcode labels 54, but each of these labels 54 has one of ten (the value of n in this example) different 2D barcodes.

Although the data format shown in FIG. 7A illustrates the type of information stored for the item 14, it does not reflect the way the database 24 implements storage of this information. In particular, since there are only ten (n) different 2D barcodes, it is not efficient to replicate this information in tens of thousands of database entries. Instead, the database 24 stores the ten different 2D barcodes in one area in a master entry, and the database 24 includes a pointer in each item record that points to the correct one of these ten 2D barcodes for that item. These ten different 2D barcodes can be stored in the database 24 when the customer is registered.

When the database owner or operator creates new entries in the database 24 for the customer, the owner or operator first creates a master entry 120a (illustrated in FIG. 7B), and then populates the master entry 120a with appropriate information. The master entry 120a includes information that is common to all of the items to be tagged and has the same format as the item record 120. Any information specific to one item (for example, a serial number) will be added to specific entries under the master entry 120a.

In this example, the owner or operator populates the company identification information 122a using the unique code associated with the company (from the supplier field 46 of the RFID tag 12), which will automatically be replicated in every specific entry under the master entry 120a.

The owner or operator may populate the item information 124a with details provided by the customer, or this may be populated automatically.

The issuer populates the readable marker information 126a with details of the ten different 2D barcodes 30 provided in the batch 28. The owner or operator populates the readable marker information 126a with the actual data from each of the ten (n) different 2D barcodes. Each of these ten different 2D barcodes has its own field that can be pointed to uniquely by an individual item record.

The database owner or operator populates the secure reader information 128a with the MAC addresses of the secure readers 20 (from the communications modules 84 in the secure readers 20), and of any other secure readers (as described below with reference to FIG. 10) that will be used. When this has been completed, the master entry 120a is complete.

Operation of Tag Validation System

There are two main modes of operation of the tag validation system 10. The first mode is to create individual item records (the new customer entries) under the master entry 120a; the second mode is to authenticate an item (such as razor pack 14) referenced by an individual item record. These operations will be described in turn.

Creating Individual Item Records

Once the master entry 120a has been created by the database owner or operator, the customer then creates individual item records 120*b* (illustrated in FIG. 7C) under the master record for that item. This will now be described with reference to FIG. 8, which is a flowchart illustrating the steps involved in creating individual item records under the master record for razor packs 12.

There will be an individual item record 120*b* for each razor pack 14 because each razor pack 14 that is manufactured has a unique serial number and will be associated with one of ten different luminescence signatures. This means that the database 24 will store hundreds of thousands or millions of entries for that type of razor pack 14, each entry associating a unique serial number with one of ten 2D barcodes.

The first step is to change the mode of the secure reader 20 to entry creation mode (step 220). This is performed by a user pressing the function button 80 repeatedly (thereby toggling through different modes) until the LCD panel 78 displays "New Entry".

The user then peels off a label 54 from a sheet 52 in the batch 28, and adheres the peeled label 54 to the razor pack 14 (step 222).

Once in entry creation mode, the user reads the RFID tag 12 on the razor pack 14 by aligning the scanning window 70 with the label 54 and depressing the trigger 76 (step 224). This causes the RF read engine 86 to read the contents of the RFID tag 12, and the marker reader module 72 to read the 2D barcode 30. The marker reader module 72 does this by (i) irradiating the label 54 with UV light from the LED source 72*a*, (ii) imaging the photochromic 2D barcode 30 that appears in response to the UV irradiation, and (iii) decoding the imaged 2D barcode 30.

Once the RFID tag 12 and the 2D barcode 30 have been read, the security module 88 then creates a new entry request (step 226). A new entry request informs the database 24 about data from the RFID tag 12 and data from the 2D barcode 30. This will provide the database 24 with the unique serial number of the particular razor pack 14 that was scanned, and the 2D barcode that was applied to that razor pack 14.

Figure 9:
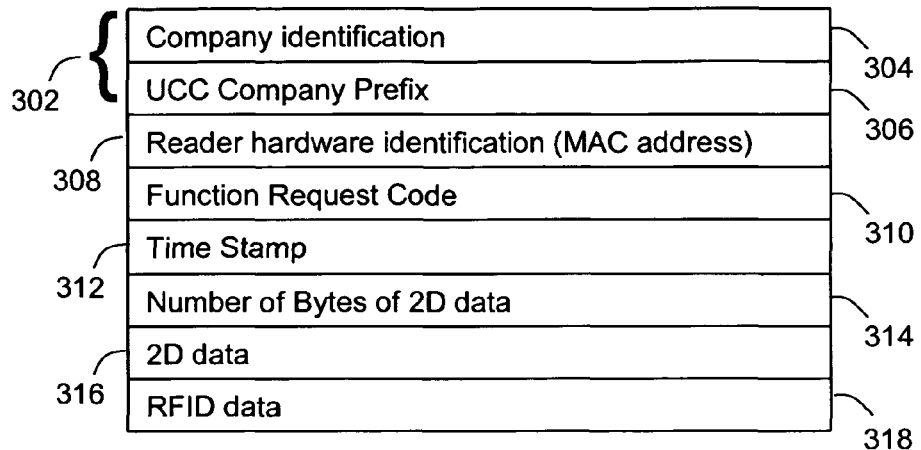
FIG. 9 is a diagram illustrating the format of a new entry request packet sent from the reader of FIG. 4 to the remote database of FIG. 6.

To create the new entry request (also called an association request), the security module 88 constructs a new entry request packet having the format shown in FIG. 9. The new entry request 300 comprises: customer identification information 302 (in FIG. 9 this is provided by a company identification field 304 and a UCC Company Prefix field 306), reader identification information 308 (in the form of a MAC address), function request information 310 (in the form of a code indicating that the request is an association request), timestamp information 312 (generated by the timestamp generator 106 in the control electronics 92), barcode data size information 314 indicating the number of bytes of 2D barcode data that will be included in the new entry request 300, barcode data field 316, and RFID data 318 containing the 96 bits read from the RFID tag 12.

The company identification field 304 stores the code for the supplier that is used in the supplier field 46 of the RFID tag 12. This is useful where the supplier field code assignment is different to the UCC Company Prefix assignment; that is, where the same company has one code for the supplier field and a different code for the UCC Company Prefix. Storing both codes in the new entry request provides a mapping between the two codes (supplier code for RFID data standard and UCC Company Prefix for 2D barcode data standard).

Only sufficient barcode data needs to be transmitted to identify which of the n (in this embodiment n is ten) different barcodes was read. In this embodiment, the security module 88 performs an MD5 hash function on the entire barcode data (obtained during the scanning step 224), and transmits the hash result in the barcode data field 316.

Once the security module 88 has populated the new entry request 300 with the relevant data, the next step is for the security module 88 to encrypt and transmit the new entry request 300 to the secure reader interface 116 in the remote database 24 (step 228) via the computer 22 and network 26. Multiple secure readers 20 may be coupled to the computer 22, which can act as a concentrator that connects individual readers 20 to the remote database 24.

On receipt of this encrypted entry request 300, the secure reader interface 116 attempts to decrypt the request 300 (step 230). If the new entry request 300 cannot be decrypted then the secure reader interface 116 responds to the secure reader 20 with a failure message (step 236), and updates the log file 119 with details of the failed request. If the new entry request 300 is correctly decrypted, then the secure reader interface 116 conveys the decrypted new entry request 300 to the authenticator 114 (step 232).

The authenticator 114 parses the new entry request 300 to authenticate the reader 20 that sent the message (step 234). This involves extracting the MAC address of the secure reader 20 from the reader identification information 308 and comparing it with the MAC addresses stored in the secure reader information 128*a* of the master record 120*a* in the database 24. If there is a match then the MAC address corresponds to that of a permitted secure reader 20, indicating that the secure reader 20 is owned or operated by (or under the authority of) the customer.

If the reader authentication step (step 234) is not successful, then the authenticator 114 conveys a failure message to the security module 88 via the secure reader interface 116 and the computer 22 (step 236). The authenticator 114 also updates the log file 119 with details of the failed request.

The authenticator 114 also compares the timestamp information 312 with previous timestamps to ensure that it is subsequent to a timestamp previously received from that secure reader 20.

If the reader authentication step (step 234) is successful, then the authenticator 114 creates a new entry 120*b* in the database 24 under the master entry 120*a* for that customer (step 238).

The new entry is indexed by a combination of the supplier code from the supplier code field 46 and the unique serial number from the serial number field 50.

The authenticator 114 populates the remaining portion of the identification information 122*b* by extracting the unique serial number from the serial number field 50 in the RFID data field 318, and combining it with the supplier code 46 automatically stored in the identification information 122*b*.

The authenticator 114 populates the item information 124 using the RFID data field 318, and particularly the item or asset reference field 48 and the serial number field 50 (FIG. 2). The item information 124 may have been partially populated (for example, with a description of the item 14) when the customer was registered.

The authenticator 114 analyzes the new entry request 300 to ascertain which of the ten (n) different 2D barcodes has been conveyed. The authenticator 114 then creates a link in the readable marker information 126*b* of the new entry 120*b* to the appropriate 2D barcode field in the readable marker information 126*a* of the master entry 120*a*. Thus, the readable marker information 126*b* in the new entry 120*b* comprises a link field 126*b*.

When the new entry 120*b* has been created under the master entry 120*a*, the authenticator 114 conveys a message to the secure reader 20 (via the secure reader interface 116, the network 26, and the computer 22) indicating that the new item record 120b was created successfully. The secure reader 20 informs the user of successful record creation via the LCD panel 78.

The user can then repeat the process for the next razor pack 14.

Authenticating an Item

When a razor pack 14 has been tagged with a label 54 and a new entry 120b for the tagged razor pack 14 has been created in the database 24, the razor pack 14 can then be shipped to a distributor or a retailer (referred to herein as a "purchaser", even though the distributor may not actually purchase the razor packs 14).

Figure 10:
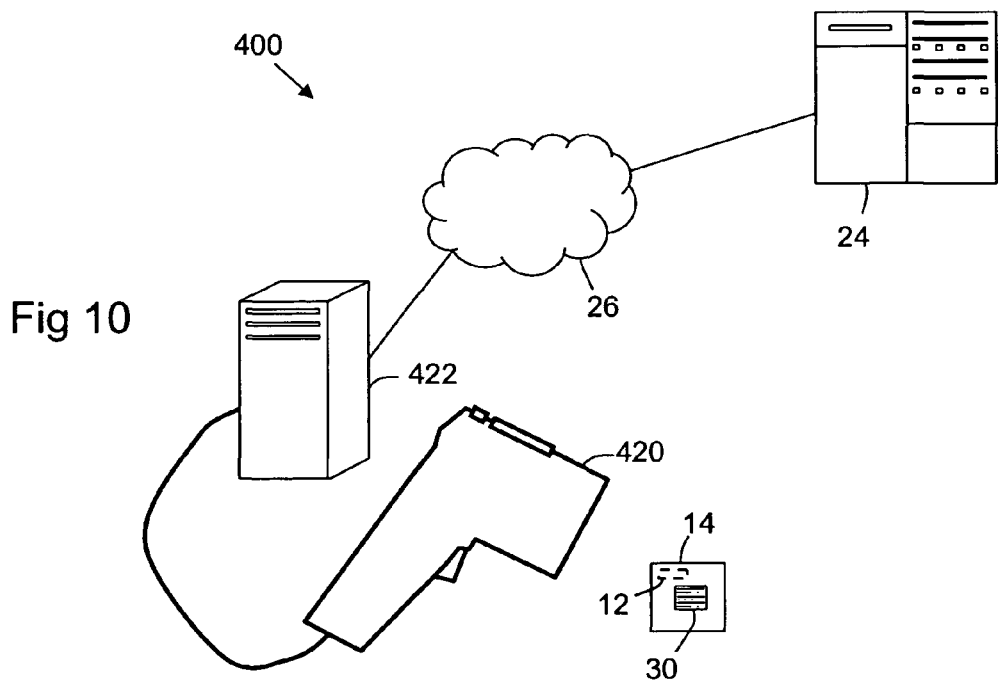
FIG. 10 is a schematic diagram of an authentication system for authenticating an item tagged by the system of FIG. 1.

When the purchaser receives the tagged razor pack 14, the purchaser can authenticate the tagged razor pack 14 using an authentication system, as shown in FIG. 10. This authentication system 400 is very similar to the data tag association and authentication system 10. The data tag association and authentication system 10 can also be used as an authentication system.

The authentication system 400 comprises: a secure reader 420, a computer 422 coupled to the secure reader 420, and the remote database 24 coupled to the computer 422 by the network 26. The secure reader 420 is very similar to the secure reader 20, the primary difference being that the secure reader 420 is only operable in one mode (authentication) and does not have a function button 80. Secure reader 20 operates in either entry creation mode or authentication mode. In almost every other respect, the secure reader 20 is identical to the secure reader 420.

Figure 11:
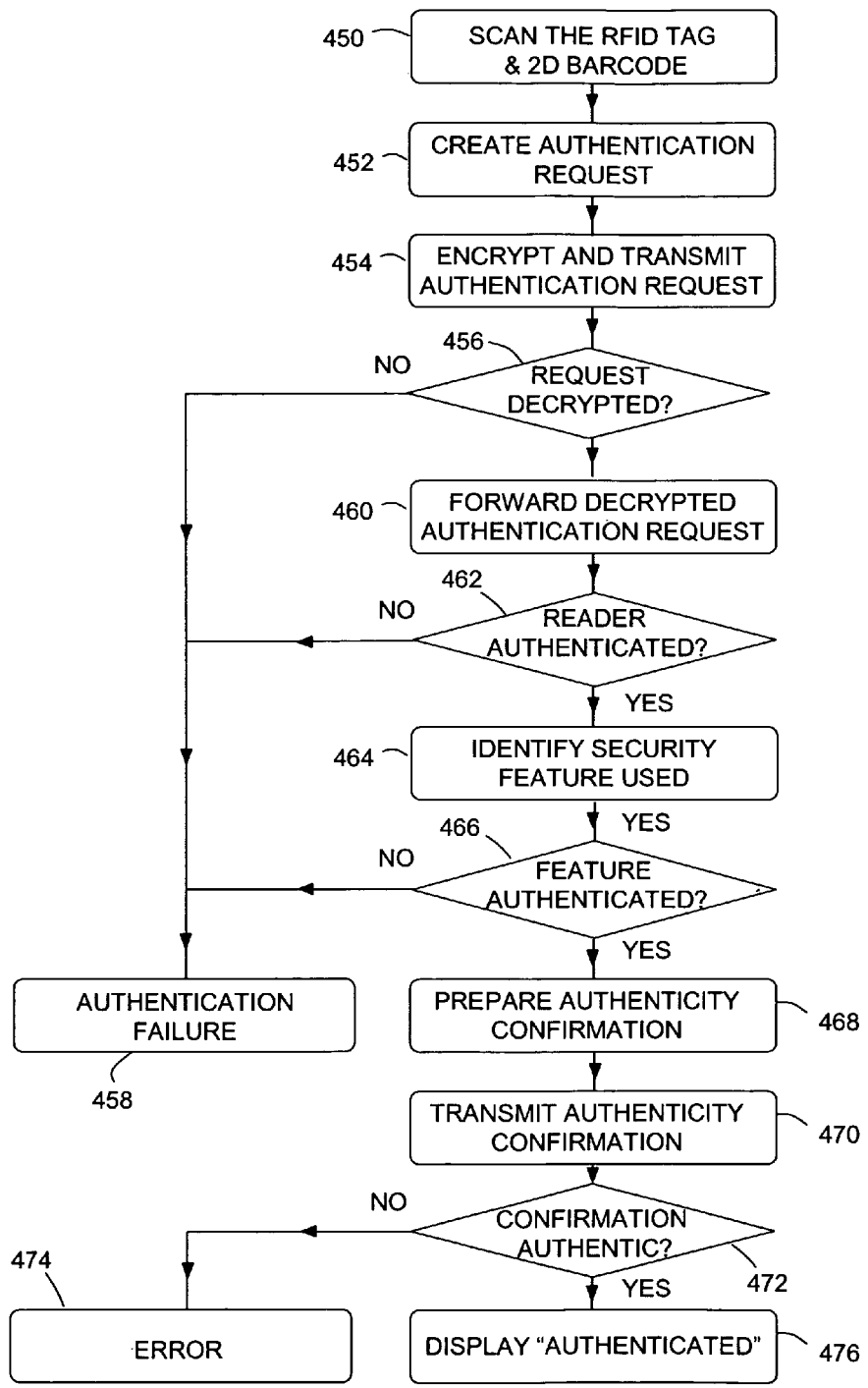
FIG. 11 is a flowchart illustrating the steps involved in authenticating an item (a razor pack) using the system of FIG. 1.

When the purchaser receives a consignment of razor packs 14, the purchaser can authenticate a tagged razor pack 14 using the process illustrated in FIG. 11.

Figure 8:
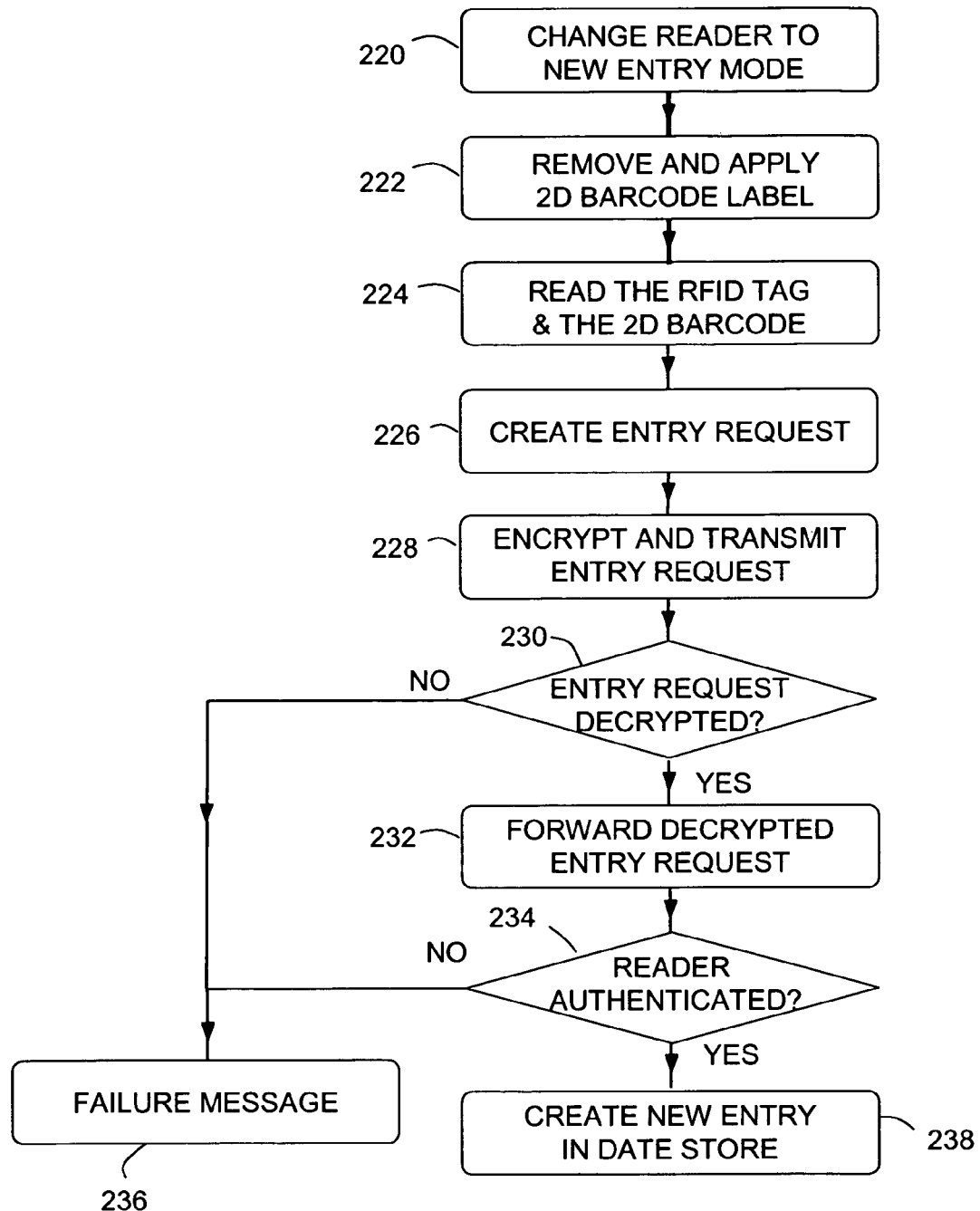
FIG. 8 is a flowchart illustrating the steps involved in creating individual entries in the remote database of FIG. 6.

The purchaser aligns the secure reader 420 with the tagged razor pack 14 and scans the 2D barcode 30 on the razor pack 14 (step 450) in a similar way to that described with reference to step 224 of FIG. 8. This causes the secure reader 420 to read the RFID tag 12 and to illuminate, scan, and decode the photochromic 2D barcode 30.

Once the RFID tag 12 and the 2D barcode 30 have been read, the secure reader 420 then creates an authentication request (step 452) using the data read from the barcode 30 (the UCC Company Prefix, and an MD5 hash of the complete barcode data) and the data read from the RFID tag 12.

Figure 12:
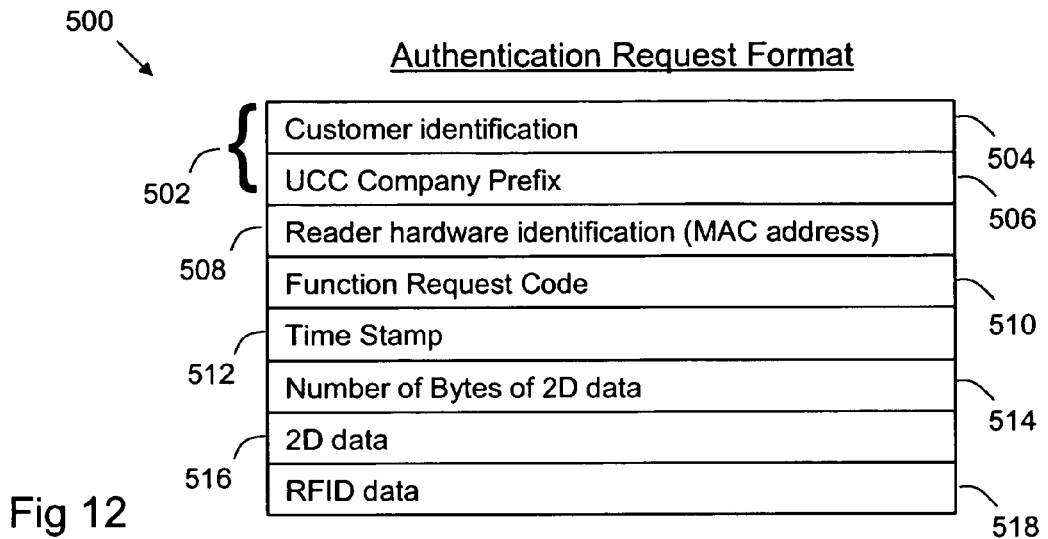
FIG. 12 is a diagram illustrating the format of an authentication request transmitted within the authentication system of FIG. 10.

To create the authentication request, the security module 88 constructs a request packet having the format shown in FIG. 12.

The authentication request 500 comprises: customer identification information 502 (provided by a customer identification field 504 and a UCC Company Prefix field 506), reader identification information 508 (in the form of a MAC address), function request information 510 (in the form of a code indicating that the request is an authentication request 500), timestamp information 512, barcode data size information 514 indicating the number of bytes of 2D barcode data that will be included in the authentication request 500, barcode data field 516, and RFID data 518 containing the 96 bits read from the RFID tag 12.

In this embodiment, the security module 88 performs an MD5 hash function on the entire barcode data (obtained during the scanning step 450), and transmits the hash result in the barcode data field 516.

Once the security reader 420 has populated the authentication request 500 with the relevant data, the next-step is for the security reader 420 to encrypt and transmit the authentication request 500 to the secure reader interface 116 in the database 24 (step 454).

On receipt of this encrypted authentication request, the secure reader interface 116 decrypts the request 500 (step 456). If the authentication request 500 cannot be decrypted then the secure reader interface 116 responds to the secure reader 420 with a failure message (step 458), and updates the log file 119 with details of the failed request. If the authentication request 500 is correctly decrypted, then the secure reader interface 116 conveys the decrypted authentication request 500 to the authenticator 114 (step 460).

The authenticator 114 then attempts to authenticate the secure reader 420 (step 462) by parsing the authentication request 500 in a similar way to that described with reference to step 234 of FIG. 8; namely, the authenticator 114 ascertains if the MAC address of the secure reader 420 corresponds to that of a permitted reader, and if so, if the permitted reader is owned or operated by (or under the authority of) the customer.

If the reader authentication step (step 462) is not successful (for example, because the MAC is not present, or present but not correct, or because the customer identification in the request is not a recognized customer identification, or because it is a recognized customer identification but does not correspond to the customer identification associated with that MAC address), then the authenticator 114 conveys a failure message to the secure reader 420 via the secure reader interface 116, the network 20, and the computer 422 (step 458), and updates the log file 119 with details of the failed request.

If the reader authentication step (step 462) is successful, then the authenticator 114 parses the authentication request 500 to ascertain which of the ten 2D barcodes 30 has been applied to the razor pack 14 (step 464). The authenticator 114 does this by accessing the individual item record 120b referenced by the authentication request 500 using the combination of the supplier code 46 and the unique serial number from the serial number field 50 as an index (both of which are provided in the RFID data 318). Once the relevant individual item record 120b has been accessed, the authenticator 114 then identifies the particular 2D barcode associated with that individual item record 120b using the link field 126b, and retrieves the hash result for that particular 2D barcode from the feature information 126a in the master entry.

The authenticator 114 then authenticates the 2D barcode 30 (step 466) by comparing the retrieved hash result (from step 464) with the hash result transmitted in the barcode data field 516.

If there is not a match, then the feature authentication step (step 466) is not successful. If the feature authentication step is not successful, then the authenticator 114 conveys a failure message to the secure reader 420 via the secure reader interface 116, the network 20, and the computer 422 (step 458), and updates the log file 119 with details of the failed request.

If there is a match between the retrieved hash result (from step 464) and the hash result transmitted in the barcode data field 516 then the feature authentication step (step 466) is successful. If the feature authentication step is successful, then the authenticator 114 prepares an authenticity confirmation for sending to the secure reader 420 that sent the authentication request 500 (step 468). The authenticator 114 also updates the log file 119 with details of the successful request.

Figure 13:
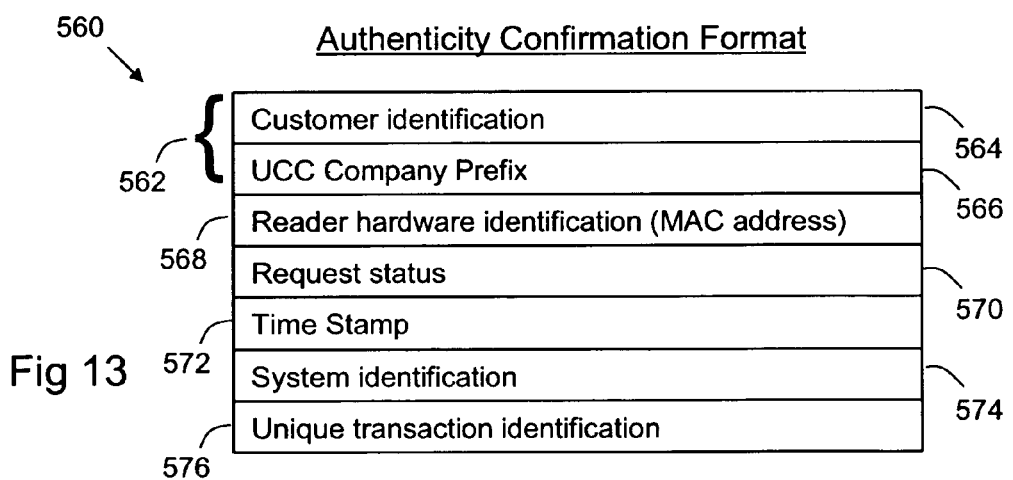
FIG. 13 is a diagram illustrating the format of an authenticity confirmation sent in response to the authentication request of FIG. 12.

The authenticity confirmation has the format shown in FIG. 13. The authenticity confirmation 560 comprises: customer identification information 562 (provided by a customer identification field 564 and a UCC Company Prefix field 566), reader identification information 568 (in the form of a MAC address), request status information 570 (which is set to indicate that the authentication request was successful), timestamp information 572 (generated by the timestamp generator in the security component 118), a system identification field 574 populated by the unique system identification from the security component 118, and a unique transaction identifier field 576 populated by the current value of the transaction identifier counter in the security component 118.

The authenticator 114 then sends the authenticity confirmation 560 to the secure reader 420 via the secure reader interface 116, the network 20, and the computer 422 (step 470).

On receipt of the authenticity confirmation 560, the secure reader 420 authenticates the authenticity confirmation 560 (step 472). It does this by parsing the authenticity confirmation 560 to validate that the system identification is correct and that the value of the timestamp is subsequent to the value of the last timestamp received by the secure reader 420.

If the system identification is not correct, or if the timestamp is not subsequent to the last timestamp received, then the secure reader 420 displays an error message (step 474).

If the authenticity confirmation 560 is authenticated by the secure reader 420, then the secure reader 420 displays the text "Authenticated" (step 476) to the purchaser.

The purchaser can then use the system 400 to authenticate the next tagged razor pack 14.

A purchaser may only authenticate one in every m razor packs received, for example, one in every hundred or one in every thousand razor packs received, as a spot check or as part of a quality assurance program.

The authenticator 114 may record the identity and/or location of the secure reader that issues an authentication request to ascertain if multiple authentication requests are received for the same item from different geographical locations within a short space of time. This may indicate that the item has been compromised by a counterfeiter.

It will now be appreciated that the above embodiment has the advantage that a number of different readable markers can be used with an item (for example, a type of razor pack) so that a counterfeiter must know which readable marker is associated with each instance of that item. This greatly increases the security of the system.

The association between the readable marker and the RFID information can be made at the point of manufacture. This way it is not useful to steal pre-printed labels. Stealing pre-printed security labels or receipts is a common method used to avoid many conventional security features.

The database by its very nature knows when the system is under attack. The database may be able to quantify the nature of the attack and the quantity of counterfeits. Knowing when and where counterfeiters are attempting to breach the security is very valuable information. Conventional security methods do not collect the data necessary to quantify attempts to breach the security. With conventional security methods counterfeiting is often determined only after significant financial loss is suffered.

Reverse engineering a label or item would not be particularly useful, as it would only allow the counterfeiter to make fakes with a single unique serial number. If they change the serial number they have no way of knowing what readable marker should be used. If they replicate the serial number and the readable marker the database will detect the multiple instances of the same serial number, and can automatically reject any authentication requests for that combination. This action would potentially reject many thousands of counterfeit items while only rejecting at most one genuine item.

Various modifications may be made to the above described embodiments within the scope of the present invention. For example, in the above embodiment the item to be tagged is a razor pack; in other embodiments, the item may be a banknote, a component of a machine, a device, a medication, an animal, or the like.

In other embodiments, the security feature batch 28 may be implemented as one or more rolls of labels. The security feature batch 28 may be mounted in a machine that automatically dispenses labels on request.

In other embodiments, the data formats and database schemas used may be different to those described above.

In other embodiments, the computer 22 may not be used; for example, the readers 20, 420 may be coupled directly to the database 24.

In other embodiments, a different readable marker may be used, for example, a luminophore, a magnetic feature, or the like.

In other embodiments, the database 24 may not store secure reader information 128. For example, where the database 24 is part of a secure, closed system, it may not be advantageous to have an additional layer of security that requires the secure readers to be registered with the database.

In other embodiments, more than one type of readable marker may be used. For example, a luminophore and a spatial code may be used.

In the above embodiment, the data tags 12 are RFID tags, and the items 14 are packs of razor cartridges; in other embodiments, different data tags may be used (for example, integrated circuit cards) and the items may be any item that requires identification.

In other embodiments, the readable marker may be printed directly on the item 14. In other embodiments, the data tag may be read prior to printing the readable marker, and the readable marker printed may include data specifically selected to match, complement, or otherwise complete the data stored on the read data tag. This would enable an offline validation of the data tag to be performed simply by reading the readable marker and comparing the data read from the readable marker with the data stored on the data tag.

In other embodiments, each readable marker may be unique. For example, each 2D barcode may include the unique serial number of the RFID tag 12 with which it is associated. This could be implemented by a system that read the RFID tag 12 (or other data tag) and then printed (or otherwise produced) on demand a readable marker (for example, a 2D barcode) including data from the RFID tag (for example, the serial number). The readable marker may be printed directly onto the item, or it may be printed onto a label for adhering to the item.

In other embodiments, to aid a user in locating the label in situ, the label may include text to inform the user where to scan for the barcode, for example, "scan here", or such like or the label may include a high visibility perimeter.

In other embodiments, the new entry request may be split into a plurality of data packets if all of the information stored on a readable marker is to be transmitted, particularly if a relatively large amount of information is represented by the readable marker (for example, a 2D barcode can represent a relatively large amount of data).

In other embodiments, the entire 2D barcode data (not just the hash result) may be transmitted by the secure reader in the association (new entry) request.

In other embodiments, a different hash function algorithm to MD5 may be used. For example, the SHA-1 or any other convenient hash function algorithm may be used.

In other embodiments, a readable marker may be applied to the item (for example, using a label or by laser etching) and data may be written to a data tag (such as an RFID transponder) to complete the data read from the readable marker.

In other embodiments, the secure reader 20 may include a spectral read engine for reading an optical security feature, such as a rare earth doped silica particle (RE particle). Details of how to manufacture this type of security feature are provided in U.S. Pat. No. 7,129,506 to Ross et al, entitled "Optically Detectable Security Feature," and US patent application No. 2005/0143249, entitled "Security Labels which are Difficult to Counterfeit", both of which are incorporated herein by reference.

The spectral read engine may comprise an illumination source in the form of a pair of LEDs emitting in the ultraviolet region of the electromagnetic spectrum. The illumination source is used to excite the RE particles. The spectral read engine may also include a spectrometer for detecting luminescence in the visible and near infra-red regions of the electromagnetic spectrum. The spectrometer measures luminescence in response to excitation by the illumination source. The LEDs may be coupled to the security module by power lines, and the spectrometer may be coupled to the security module by power and data lines. The security module may control the spectral read engine and/or process data measured by the spectral read engine.

What is claimed is:

1. A method of enabling subsequent validation of an item having a data tag, the method comprising:
    reading data from a tag using an electronic reader, the tag comprising an RFID tag that emits data of at least an identified company and a unique serial number for the item;
    selecting a readable marker from a plurality of different readable markers, each readable marker comprising a photochromic 2D barcode that comprises data including the identified company;
    applying the selected readable marker to the item in proximity to the tag; and
    communicating an association request to a database, where the association request comprises data from the tag including the identified company and the unique serial number for the item and data from the selected readable marker to identify which of the plurality of different readable markers was read, the database storing data from the association request for subsequent validation of the tag.

2. A method according to claim 1, wherein the step of selecting a readable marker from a plurality of different readable markers is performed before or contemporaneously with the step of reading data from a tag using an electronic reader.

3. A method according to claim 1, wherein the step of selecting a readable marker from a plurality of different readable markers is implemented by selecting from a prepared batch of different readable markers of the same type.

4. A method according to claim 1, wherein the step of applying the selected readable marker in proximity to the tag is implemented by removing the selected readable marker from a holder and adhering the label to the tag or to an item to which the tag is affixed.

5. A method according to claim 1, further comprising the step of reading the selected readable marker either before, during, or after the step of applying the selected readable marker in proximity to the tag.

6. The method according to claim 1, wherein the item is sold in a pack and the tag is inside the pack and the readable marker is applied on an outer surface of the pack.

7. The method according to claim 1 further comprising utilizing data from the association request at a later time to determine if data read from the tag has been changed.

8. A method of recording an association between an item having a data tag and a readable marker applied to that item, the method comprising:
    receiving an association request comprising data from the data tag, the tag comprising an RFID tag emitting data of at least an identified company and a unique serial number for the item, and information from a readable marker applied to the item, the readable marker comprising a photochromic 2D barcode that comprises data including the identified company;
    verifying the validity of the association request; and
    creating an entry for the tagged item in the event that the association request is validated, the entry comprising data from the tag, and information identifying the readable marker applied to the tagged item.

9. A method according to claim 8, wherein the step of creating an entry for the tagged item includes indexing the entry using information read from the tag.

10. A method according to claim 8, wherein the step of verifying the validity of the association request includes validating that the association request relates to an item not previously associated.

11. A method according to claim 8, wherein creating an entry includes providing a field including or referencing information about secure readers permitted to request authentication of the tagged item.

12. A method according to claim 11, wherein verifying the validity of the association request includes validating that the association request was transmitted by an authorized marker reader.

13. A method according to claim 8, wherein the method includes the further steps of:
    receiving an authentication request comprising data read from a tag on an item and information about a readable marker applied to the tagged item,
    comparing the authentication request with the created entry to ascertain if the tagged item is authentic, and
    validating the authentication request in the event of a match.

14. A portable secure reader comprising:
    an RFID reader for reading an RFID tag attached to an item;
    an LED source for exposing a photochromic 2D barcode on the item to ultraviolet light;
    a 2D imager for reading the photochromic 2D barcode when the LED source exposes the photochromic 2D barcode to ultraviolet light;
    a communications module including a unique hardware identification for the portable secure reader; and
    control electronics for controllably driving the RFID reader, the LED source, the 2D imager, and the communications module to communicate data read from the RFID tag including a unique serial number for the item and an identifier for the item's manufacturer, as well as, identifying data read from the photochromic 2D barcode.

15. The portable secure reader of claim 14 wherein the control electronics is mounted in a sealed housing along with a cryptographic processor to support encrypted communication by the portable secure reader.

16. The portable secure reader of claim 14 wherein the control electronics further comprise a clock and a timestamp generator.

17. The portable secure reader of claim 14 further comprising a mode selector enabling selection of an entry selection mode.

18. The portable secure reader of claim 17 where upon reading the RFID tag and the 2D barcode in the entry selection mode, a security module creates a new entry request.

19. The portable secure reader of claim 18 wherein the new entry request comprises company identification information and reader identification information.

20. The portable secure reader of claim 14 wherein the portable secure reader operates in an authentication mode to create an authentication request.

* * * * *